United States Patent [19]
Sarem

[11] 3,805,893
[45] Apr. 23, 1974

[54] MOBILITY-CONTROLLED CAUSTIC FLOOD

[75] Inventor: Amir M. Sarem, Yorba Linda, Calif.

[73] Assignee: Union Oil Company of California, Los Angeles, Calif.

[22] Filed: Aug. 28, 1972

[21] Appl. No.: 284,345

[52] U.S. Cl. ................................ 166/270, 166/273
[51] Int. Cl. ............................................ E21b 43/22
[58] Field of Search .................. 166/270, 273–275, 166/292, 300

[56] References Cited
UNITED STATES PATENTS

| | | | |
|---|---|---|---|
| 3,396,790 | 8/1968 | Eaton............................. | 166/273 X |
| 3,658,131 | 4/1972 | Biles .............................. | 166/273 X |
| 3,261,400 | 7/1966 | Elfrink .......................... | 166/292 |
| 3,656,550 | 4/1972 | Wagner et al. ................ | 166/270 |
| 3,530,937 | 9/1970 | Bernard ......................... | 166/273 X |
| 3,386,509 | 6/1968 | Froning.......................... | 166/300 X |
| 3,202,214 | 8/1965 | McLaughlin, Jr............... | 166/292 |
| 3,342,262 | 9/1967 | King et al. .................... | 166/292 |
| 2,402,588 | 6/1946 | Andresen....................... | 166/270 |
| 2,747,670 | 5/1956 | King et al. ..................... | 166/270 |
| 3,285,338 | 11/1966 | Boston........................... | 166/273 X |
| 2,920,041 | 1/1960 | Meadors ........................ | 166/275 |

Primary Examiner—Stephen J. Novosad
Attorney, Agent, or Firm—Dean Sandford

[57] ABSTRACT

A process for the recovery of oil from a subterranean petroleum reservoir wherein small slugs of a dilute aqueous alkaline metal silicate solution and a dilute aqueous solution of an agent that reacts with the alkali metal silicate to form a gelatinous precipitate are alternately injected into the reservoir through one or more injection wells, and oil recovered from spaced production wells. A small slug of water is injected between successive slugs of the reactant solutions to separate the reactants during injection.

11 Claims, 3 Drawing Figures

MOBILITY-CONTROLLED CAUSTIC FLOOD

DESCRIPTION OF THE INVENTION

This invention relates to the recovery of petroleum from subterranean reservoirs, and more particularly to the recovery of viscous oil from heterogeneous reservoirs.

Because substantial amounts of oil remain unrecovered at the completion of normal primary recovery operations, various secondary methods or recovering additional quantities of oil have been proposed. These processes generally consist of the injection of one or more fluids into the reservoir to drive oil towards spaced production wells from where it is recovered. However, the processes differ markedly in their essential steps, and in the results obtained and cost involved. It has long been recognized that the overall recovery efficiency of a secondary recovery operation is a function of the displacement efficiency and the areal and vertical sweep efficiencies, and can be expressed by the relationship $$R = D \times S \times C$$

wherein

R is the overall recovery efficiency expressed as a decimal fraction;

D is the displacement efficiency expressed as a decimal fraction;

S is the areal sweep efficiency expressed as a decimal fraction; and

C is the vertical sweep efficiency expressed as a decimal fraction.

It is known that displacement efficiency is increased as the interfacial tension between the connate oil and the displacing fluid is reduced, and that in the truly miscible displacement processes displacement efficiencies of 90 to 100 percent can be obtained. It is also known that the interfacial tension between many crude oils and water is pH dependent and that these interfacial tensions can be markedly lowered by raising the pH of the flood water injected to drive the oil to the producing wells. Thus, in certain instances the so-called "caustic flooding" processes can be effective in increasing the displacement efficiency.

However, even though displacement efficiency can be beneficially affected by flooding with high pH flood water such as an aqueous solution of sodium hydroxide, the overall recovery of the process is usually undesirably low because of the low areal and vertical sweep efficiencies, particularly in heterogeneous reservoirs or where the reservoir oil is viscous. This loss in efficiency is generally attributable to the poor mobility ratio existing between the connate oil and the flood water, which typically results in early breakthrough of flood water into the producing wells and rapidly increasing produced water/oil ratios which often necessitate abandonment of the recovery operation even though substantial oil remains unrecovered. Although these problems can to some extent be mitigated by adding thickening agents to the flood water to increase its viscosity to reduce the difference in mobility between the flood water and the oil, and by selectively plugging the water channels in a separate plugging step, water channelling nevertheless remains a problem, particularly in the recovery of viscous oils from heterogeneous reservoirs. Thus, need exists for an improved caustic flooding process having an increased recovery efficiency, and particularly for a process that can be used to economically recover viscous oil from heterogeneous reservoirs.

Accordingly, a principal object of this invention is to provide an improved process for the secondary recovery of oil from a subterranean reservoir.

Another object of the invention is to provide an improved process for the secondary recovery of viscous oil from a subterranean reservoir.

Still another object of the invention is to provide an improved process for the secondary recovery of oil from a heterogeneous subterranean reservoir.

A yet further object of the invention is to provide an improved caustic flooding process.

Other objects and advantages of the invention will be apparent from the following description.

Briefly, this invention contemplates a process for the recovery of oil from a subterranean petroleum reservoir wherein small slugs of a dilute aqueous alkaline alkali metal silicate solution and a dilute aqueous solution of an agent that reacts with the alkali metal silicate to form a gelatinous precipitate are alternately injected into the reservoir through one or more injection wells, and oil is recovered from spaced production wells. A small slug of water is injected between successive slugs of the reactant solutions to separate the reactants during injection.

Crude petroleum is known to contain varying amounts of saponifiable materials such as petroleum acids which react with alkaline materials to form soaps that reduce the interfacial tension between the crude petroleum and water. The petroleum acids found in any particular crude petroleum can include various carboxylic acids and phenolic acids. Saponification of these acids forms surface active agents that reduce the interfacial tension between the crude petroleum and water. The amount of these saponifiable materials in a crude petroleum and their effect upon the surface active properties of the system can be characterized by the variation of the interfacial tension of the oil-water system as a function of pH. The interfacial tension of a typical crude petroleum-water system at low pH is usually about 20 to 40 dynes/cm. Those crude oils having significantly high contents of saponifiable materials are characterized by reduced interfacial tension at high pH. The method of this invention is particularly applicable to the recovery of crude petroleum that exhibits an interfacial tension with water at a high pH of 5 dynes/cm or less, and more particularly to crude petroleum that exhibits an interfacial tension of 2 dynes/cm or less.

Also, it is well known that high viscosity crude petroleum is less amenable to recovery by waterflooding than the lower viscosity oils. While the method of this invention can be efficaciously employed to recover low viscosity crude petroleum, it has particular application in the recovery of crude petroleum exhibiting a viscosity above that of the flood water under reservoir conditions of temperature and pressure, and more particularly above about 5 centipoises at reservoir conditions.

While the method of this invention is particularly adapted for recovery of oil from heterogeneous reservoirs, as a practical matter, most petroleum reservoirs exhibit some heterogeneity and, thus, the overall recovery efficiency of the displacement process is improved in most naturally occurring petroleum reservoirs by treatment with the process of this invention. By heterogeneity, it is meant that the reservoir is comprised of stratified layers of varying permeability, or that it contains fractures, cracks, fissures, streaks, vuggs, or zones of varying permeability that cause an injected flooding medium to advance through the reservoir nonuniformly. Thus, the formation that are particularly amenable to treatment by the method of this invention are those formations that have strata or zones of different permeabilities, and particularly formations having strata varying more than about 50 millidarcies in permeability or which are otherwise structurally faulted to the extent that the injected flooding media does not advance through the formation at a substantially uniform rate along the entire flood front, but which instead are susceptible to channelling of the flood water to the producing well.

The invention is further described by reference to the appended drawings, wherein.

The method of this invention is practiced by alternately injecting successive small slugs of a dilute aqueous alkaline alkali metal silicate solution and a dilute aqueous solution of an agent that reacts with the alkali metal silicate to form a gelatinous precipitate, the reactive agent solutions being separated by small slugs of water. The water injected between successive slugs of the reactant solutions separates these slugs in the well and in the formation immediately adjacent to the well to prevent premature precipitation that might restrict injectivity. The water used in the spacer slug should not react to any appreciable extent with either the alkaline alkali metal silicate or with the other reactive agent to form solid precipitates. On injection into the reservoir, these reactant solutions enter the more permeable channels and eventually become admixed whereupon they react to form a solid precipitate that tends to reduce the permeability of those strata and divert the subsequently injected fluids to other strata. It is postulated that the dilute reactant solutions do not completely plug the permeable strata such as do many of the previously known plugging treatments, but instead effect a permeability reduction tending to continually redistribute the injected fluids so long as the injection process is continued. However, despite any uncertainty in the exact mechanism by which the process operates, it has nevertheless been demonstrated that the process of this invention is effective in increasing oil recovery, and particularly the recovery of relatively viscous oil from heterogeneous reservoirs.

Figure 1:
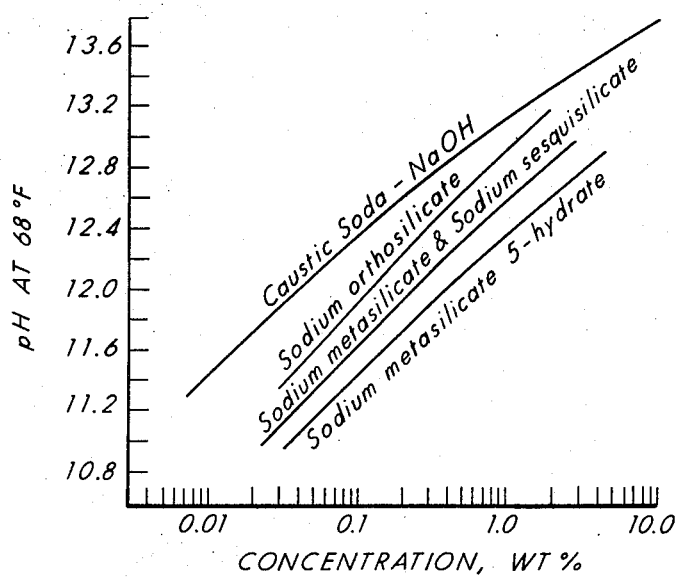
FIG. 1 is a graph illustrating the variation in the pH of aqueous solutions of various alkaline sodium silicates and sodium hydroxide as a function of the concentration of the alkaline material.

The alkaline alkali metal silicate employed in the practice of this invention is an alkali metal silicate having a molar ratio of $M_2O/SiO_2$ of 1 and above, wherein M is an alkali metal atom, such as sodium potassium, lithium, cesium and rubidium, exemplary of which are alkali metal orthosilicate, alkali metal metasilicate, alkali metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. The pH of aqueous solutions containing various concentrations of alkaline sodium silicates are shown in FIG. 1. These alkaline sodium silicates generally provide lower pH solutions than equal weight concentration solutions of sodium hydroxide, but nevertheless, provide high pH solutions useful in reducing the interfacial tension of many crude petroleum-water systems. Sodium orthosilicate is a particularly preferred alkaline alkali metal silicate because of its relatively high pH.

In practicing the invention, the variation in interfacial tension between the crude petroleum in the reservoir to be treated and water as a function of pH is first determined. If the interfacial tension is significantly lowered in alkaline systems, i.e., the interfacial tension can be lowered to less than about 5 dynes/cm, and preferably to less than about 1 dynes/cm by pH adjustment, the pH required to obtain the desired interfacial tension is determined. The concentration of alkaline alkali metal silicate required to provide this pH is determined from FIG. 1. Accordingly, it is within the scope of this invention to employ a concentration of alkaline alkali metal silicate effective to reduce the interfacial tension between the petroleum and water to less than about 5 dynes/cm, and preferably to less than about 2 dynes/cm. With most crude oils containing a significant quantity of saponifiable materials, interfacial tension reduction can be obtained by the addition of about 0.01 to 0.8 weight percent alkaline alkali metal silicate, and preferably about 0.05 to 0.3 weight percent.

The alkaline alkali metal silicates used in the practice of this invention are available in solid form, and the respective alkaline alkali metal silicate solutions can be prepared by dissolving an appropriate quantity of the alkaline alkali metal silicate in water. However, in many cases it is more convenient and less costly to prepare the alkaline alkali metal silicate by adding caustic to an aqueous solution of a low-alkalinity alkali metal silicate having a $Na_2O/SiO_2$ ratio of less than 1.

A wide variety of reagents can be employed to react with the alkaline alkali metal silicate to form the mobility adjusting precipitate, inclusive of which are acids and acid precursors such as chlorine, sulfur dioxide, sulfur trioxide; water-soluble salts of bivalent metals such as the halide and nitrate salts of iron, aluminum, calcium, cobalt, nickel, copper, mercury, silver, lead, chromium, zinc, cadmium and magnesium; and water-soluble ammonium salts. A preferred agent for reaction with the alkaline alkali metal silicate is calcium chloride.

Preferably, approximately the same volumetric quantities of each aqueous reactant solution are injected in each injection cycle, with the concentration of the water-soluble agent that reacts with the alkaline alkali metal silicate being adjusted to provide sufficient agent to stoichiometrically react with the silicate.

Each slug of reactant solution is injected at conventional flood water injection rates such as rates of about 100 to 2,000 barrels per day for a period of about 1 hour to about 7 days, and preferably for a period of about 4 hours to 1 day. The water slug injected intermediate the slugs of reactive solutions can be injected in smaller volume. The following is a typical injection cycle:

| Slug | Time | |
|---|---|---|
| | Broad Range | Preferred Range |
| Alkaline alkali metal silicate solution | 1 hour to 7 days | 4 hours to 1 day |
| Water | 1 hour to 1 day | 1 to 8 hours |
| Aqueous solution of rectant | 1 hour to 7 days | 4 hours to 1 day |
| Water | 1 hour to 1 day | 1 to 8 hours |

It has been found in some instances the injection pressure increases during the alkaline alkali metal silicate solution injection step, and then decreases to its original value during the remaining injection steps of that cycle, rising again upon the next injection of alkaline alkali metal silicate solution. Thus, in some instances the slug injection times must be sufficiently short to prevent excessive injection pressures.

In a preferred mode of practicing the invention to recover oil from a subterranean reservoir, an aqueous solution of sodium orthosilicate is prepared having a sodium orthosilicate concentration selected to provide a pH sufficient to reduce the interfacial tension of the oil-water system to less than 5 dynes/cm, and preferably to a value of less than 2 dynes/cm. The sodium orthosilicate solution is injected into the reservoir through an injection well for a period of about 4 hours to 1 day, followed by water injection for about 1 hour to 8 hours, then by a slug of an aqueous solution containing a stoichiometric quantity of a second reactant such as calcium chloride substantially equal in volume to said slug of alkaline sodium orthosilicate solution, and then by the injection of water for about 1 hour to 8 hours. This cycle is repeated throughout the flooding operation, and oil and other produced fluids are recovered from a spaced production well. While the mobility-controlled caustic treatment can be followed by conventional water drive, it has been found in some instances that the subsequently injected flood water soon breaks through to the producing wells. Hence, it is preferred to maintain the above-described chemical injections for substantially the entire recovery operation.

This invention is further illustrated by the following examples which are illustrative of specific modes of practicing the invention and are not intended as limiting the scope of the invention as defined by the appended claims.

EXAMPLE 1

An aqueous alkaline sodium orthosilicate solution is prepared by admixing 0.958 parts by weight of a commercial low alkalinity sodium silicate solution containing 8.9 weight percent $Na_2O$ and 28.7 weight percent $SiO_2$ ($Na_2O/SiO_2$ weight ratio of 0.31) marketed by the Philadelphia Quartz Company under the trademark PQ Sodium Silicate N, with 1.35 parts by weight of 50 weight percent sodium hydroxide solution. The resulting alkaline sodium orthosilicate solution is diluted with water to provide a dilute aqueous solution having an alkaline sodium orthosilicate concentration of about 0.12 weight percent.

EXAMPLE 2

The method of this invention is demonstrated by a pilot test conducted in a small area of a field having wells completed in the Pliocene sand. The oil produced from this reservoir has an API gravity of about 16° and a viscosity of about 90 centipoises at the reservoir temperature of about 135° F. Two chemical injection wells located about 800 feet apart are employed with a water injection well being located about equidistant between the chemical injectors. Seven offset producing wells are arranged generally surrounding the injection wells. The test zone had previously been waterflooded and was about to be abandoned as uneconomic.

Figure 2:
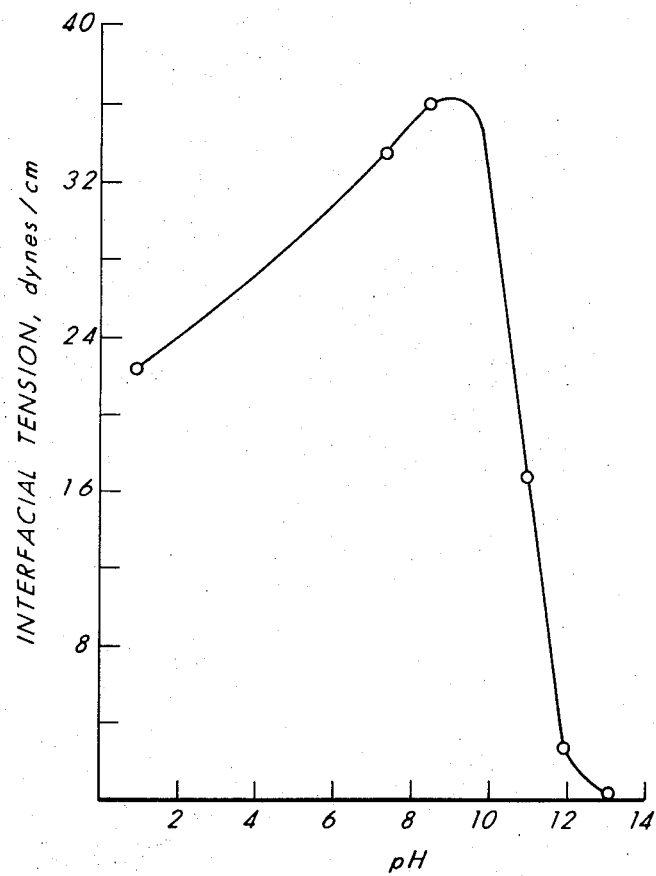
FIG. 2 is a graph illustrating the variation in the interfacial tension of a crude petroleum-water system with pH wherein the crude petroleum contains saponifiable petroleum acids.

The variation in the interfacial tension between the produced oil and injected water as a function of pH is determined, and this data reported in FIG. 2. Reduction of the interfacial tension to a value of about 2 dynes/cm requires a pH of about 12.0. From FIG. 1 it is determined that a 0.12 weight percent solution of sodium orthosilicate is required to obtain this pH. The sodium orthosilicate solution is prepared substantially as described in Example 1.

Figure 3:
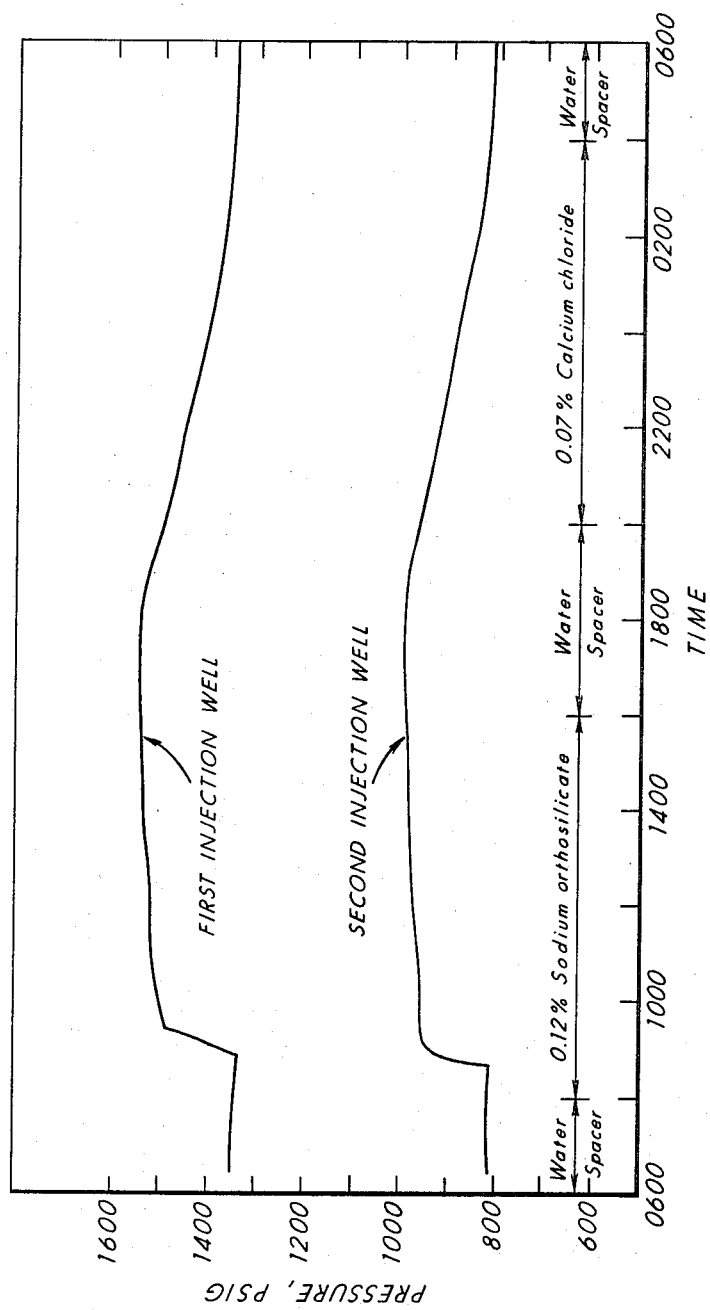
FIG. 3 is a graph illustrating the variation in injection pressure observed during the injection cycle.

The test is conducted by alternately injecting small slugs of (1) an aqueous solution containing 0.12 weight percent of sodium orthosilicate, (2) water, (3) an aqueous solution containing 0.07 weight percent of calcium chloride, and (4) water. Injection pressures increase during the sodium orthosilicate injection step, and decrease during the subsequent water and calcium chloride injection steps, even though injection rates are maintained substantially constant at about 600 barrels per day in one well and about 1,000 barrels per day in the second well. Typical wellhead pressure fluctuations for each injection well during one injection cycle are plotted in FIG. 3. The injection cycle time is adjusted periodically to avoid excessive pressure rises and because of other field operating requirements. The following is a typical injection cycle:

| Material Injected | Injection time, hours |
|---|---|
| Sodium orthosilicate solution | 8 |
| Water | 4 |
| Calcium chloride solution | 8 |
| Water | 4 |

These alternate injections are continued for a period of about 15 months. A total of 14,400 barrels of incremental oil not recoverable by water flood is produced. Also, tracer tests conducted before injection of the chemicals indicate severe channelling to one of the producing wells. In this test, a tracer injected into one of the injection wells appeared in one of the producing wells within three days. A similar tracer test conducted later in the program gave no indication of channelling. Pressure tests conducted on the injection wells indicated that the well injectivity increased during the life of the test, and that the mobility of the formation decreased.

Various embodiments and modifications of this invention have been described in the foregoing description and examples, and further modifications will be apparent to those skilled in the art. Such modifications are included within the scope of this invention as defined by the following claims.

Having now described the invention, I claim:

1. A process for recovering petroleum from a subterranean reservoir penetrated by an injection well and a production well spaced apart in the reservoir, which comprises alternately injecting through said injection well and into said reservoir a series of small slugs of (1) a dilute aqueous solution of an alkali metal silicate having a molar ratio of $M_2O/SiO_2$ of 1 or above wherein M is an alkali metal atom, (2) water, (3) a dilute aqueous solution of a water-soluble material that reacts with the alkali metal silicate to form a precipitate, and (4) water; repeating the foregoing injection cycle a plurality of times; and recovering petroleum from said production well.

2. The method defined in claim 1 wherein said petroleum is of the type having reduced interfacial tension with water at high pH, and wherein the concentration of alkaline alkali metal silicate is sufficient to reduce the interfacial tension to less than about 5 dynes/cm.

3. The method defined in claim 1 wherein said petroleum is a viscous petroleum having a viscosity above about 5 centipoise at reservoir conditions of temperature and pressure.

4. The method defined in claim 1 wherein said reservoir is a heterogeneous reservoir having strata of different permeabilities varying by more than about 50 millidarcies.

5. A process for recovering petroleum of the type that exhibits decreased interfacial tension with water at high pH from a subterranean reservoir penetrated by an injection well and a production well, which comprises:
1. sequentially injecting a series of small slugs of (a) a dilute aqueous solution containing from about 0.01 to 0.8 weight percent of an alkaline alakli metal silicate having a molar ratio of $M_2O/SiO_2$ of 1 or above wherein M is an alkali metal atom, (b) water, (c) a dilute aqueous solution containing approximately a stoichiometric quantity of a water-soluble material that reacts with the alkali metal silicate to form a precipitate, and (d) water;
2. repeating the injection cycle defined in step 1 a plurality of times; and
3. simultaneously therewith recovering oil from said production well.

6. The method defined in claim 5 wherein the concentration of alkaline alkali metal silicate in said aqueous solution thereof is adjusted to provide a pH sufficient to reduce the interfacial tension between said petroleum and water to less than about 5 dynes/cm.

7. The method defined in claim 5 wherein said alkaline alkali metal silicate is sodium or potassium orthosilicate, sodium or potassium metasilicate, sodium or potassium metasilicate pentahydrate, or sodium or potassium sequisilicate.

8. The method defined in claim 5 wherein said material that reacts with said alkali metal silicate is a water-soluble salt of a divalent metal.

9. The method defined in claim 5 wherein said aqueous alkaline alkali metal silicate solution and said aqueous reactant solution are injected at a normal water injection rate for a period of about 1 hour to about 7 days, and said water slugs are injected for a period of about 1 hour to about 1 day.

10. A process for recovering petroleum of the type that exhibits decreased interfacial tension with water at high pH from a subterranean reservoir penetrated by an injection well and a production well, which comprises:
1. injecting the following sequence of aqueous fluids through said injection well and into said reservoir at normal water injection rates;
   a. a dilute aqueous solution containing an amount between about 0.01 to 0.8 weight percent of sodium orthosilicate sufficient to reduce the interfacial tension of said petroleum to less than 2 dynes/cm, said solution being injected for a period of about 1 hour to 7 days,
   b. water for a period of about 1 hour to 1 day,
   c. a dilute aqueous calcium chloride solution containing a concentration of calcium chloride approximately equivalent to that required to stoichiometrically react with said sodium orthosilicate, said solution being injected for a time period approximately equal to the sodium orthosilicate solution injection period, and
   d. water for a period of about 1 hour to 1 day;
2. repeating the injection sequence of step (1) a plurality of times during the recovery process; and
3. recovering said petroleum from the production well.

11. The method defined in claim 10 wherein said aqueous sodium orthosilicate solution is injected for a period of about 4 hours to 1 day and said water spacer slugs for a period of about 1 hour to 8 hours.

* * * * *